United States Patent Office 3,377,355
Patented Apr. 9, 1968

3,377,355
4-THIAZOLIDONES AND OXIDE DERIVATIVES THEREOF
Alexander R. Surrey, Albany, N.Y., assignor to Sterling Drug Inc., New York, N.Y., a corporation of Delaware
No Drawing. Continuation-in-part of application Ser. No. 120,501, June 27, 1961. This application June 30, 1967, Ser. No. 650,233
13 Claims. (Cl. 260—301)

ABSTRACT OF THE DISCLOSURE 2-aryl-3-(Q—Y'—O—Y)-4-thiazolidones, where Q is monocarbocyclic-aryl or lower-alkyl, Y' is a direct linkage or lower-alkylene, and Y is polycarbon-lower-alkylene, are prepared by reacting Q—Y'—O—Y—$NH_2$ with a benzaldehyde and heating the resulting azomethine with an α-mercaptoalkanoic acid. The corresponding 1-oxides and 1,1-dioxides are obtained by oxidizing said 4-thiazolidones with a suitable oxidizing agent, e.g., peracetic acid and potassium permanganate, respectively. The compounds have psychomotor stimulatory, anticonvulsant and barbiturate potentiating properties.

---

This invention relates to 2-aryl-4-thiazolidones, -1-oxides and -1,1-dioxides, and is particularly concerned with certain 3-substituted derivatives thereof and methods for the preparation of such derivatives.

This application is a continuation-in-part of my copending application Ser. No. 120,501, filed June 29, 1961, and now abandoned.

Among the compounds of my invention are those of the Formula I

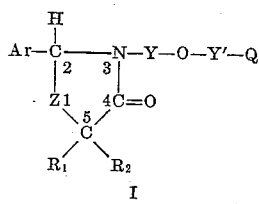

where Ar is monocarbocyclic-aryl, Y is polycarbon-lower-alkylene Y' is a direct linkage or lower-alkylene, Q is monocarbocyclic-aryl or lower-alkyl, Z is S, SO or $SO_2$, and $R_1$ and $R_2$ each is hydrogen or lower-alkyl. Thus, this aspect of my invention is a compound selected from the group consisting of 2-(monocarbocyclic-aryl)-3-[Q-Y'-O-(polycarbon-lower-alkyl)] - 4 - thiazolidones, and, -1-oxides and -1,1-dioxides thereof where Q and Y' are defined as above.

The compounds of my invention have been tested by standard pharmacological evaluation procedures and found to possess psychomotor stimulatory properties, anticonvulsant properties and barbiturate potentiating activity. These compounds also have the additional advantageous property of having relatively low toxicity. The compounds where Z is S also are intermediates for the preparation of the compounds where Z is SO or $SO_2$. Also the compounds where Z is SO can be used as intermediates for the preparation of the compounds where Z is $SO_2$.

The term "monocarbocyclic-aryl," as used herein in the definitions of Ar and Q, which may be the same or different, means monocarbocyclic-aryl radicals having six ring carbon atoms, that is, aryl radicals of the benzene series, as illustrated by the unsubstituted phenyl radical and phenyl radicals substituted by low molecular weight substituents such as lower-alkyl, lower-alkoxy, lower-alkylmercapto, lower-alkylsulfonyl, halo, trifluoromethyl, nitro, amino, lower-alkylamino, lower-alkanoylamino, phenoxy, benzyloxy, hydroxy, phenylmercapto, benzyl, and 4-chlorophenoxy. The substituted phenyl radicals have preferably from one to three substituents which can be in any of the available positions of the phenyl nucleus, and where more than one substituent is present, they can be the same or different and they can be in any of the various position combinations relative to each other. The halo substituents include chloro, bromo, iodo and fluoro. The lower-alkyl, lower-alkoxy, lower-alkylmercapto, lower-alkylsulfonyl, lower-alkylamino, lower-alkanoylamino, and the like substituents have preferably from one to six carbon atoms which can be arranged as straight or branched chains, and are illustrated by methyl, ethyl, n-propyl, isobutyl, n-hexyl, methoxy, isobutoxy, ethylmercapto, n-amylmercapto, isopropylsulfonyl, n-butylsulfonyl, ethylamino, n-butylamino, acetaylamino, propionylamino, and the like.

The term "polycarbon-lower-alkylene," as used herein and designated as Y in Formula I, means alkylene radicals having from two to six carbon atoms and having its two free valence bonds, i.e., connecting linkages, on different carbon atoms and is illustrated by

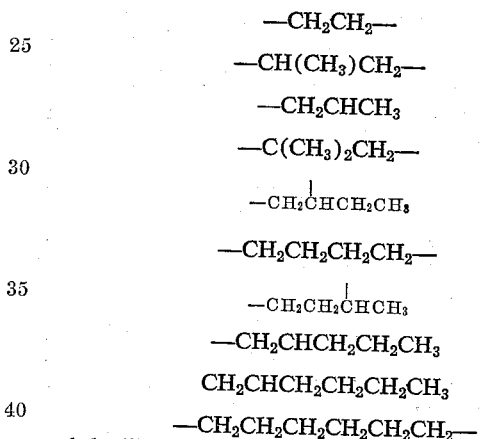

and the like.

The term "lower-alkylene," as used herein and designated as Y' in Formula I, means alkylene radicals having from one to six carbon atoms and is illustrated by
—$CH_2$—

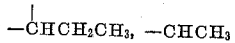

—$CH_2CH_2$—, —$CH_2CH_2CH_2$—, and the like, including other illustrations given above for Y.

The term "lower-alkyl," as used herein, e.g., as one of the meanings for Q, $R_1$ or $R_2$ in Formula I, means alkyl radicals having from one to six carbon atoms and is illustrated by methyl, ethyl, n-propyl, isopropyl, n-butyl, 2-butyl, isobutyl, n-amyl, isoamyl, n-hexyl, 3-hexyl, and the like.

The compounds of Formula I where Z is S are prepared by reacting an azomethine of the Formula II

where Ar, Y, Y' and Q have the same meanings designated above, with an α-mercaptoacetic acid of the formula $HSC(R_1)(R_2)COOH$ under a variety of conditions, with or without a solvent. A preferred procedure is to carry out the reaction in refluxing benzene with a continuous separator connected to the apparatus (see illustrations on pages 262 and 422, Organic Syntheses, Collective Volume 1, 2nd ed., N.Y., 1941) to remove the water formed by the reaction. The formation of the thiazolidone ring probably takes place in two steps, as follows: addition of the mercaptoacetic acid to the double bond of the azomethine to form the compound of the Formula III

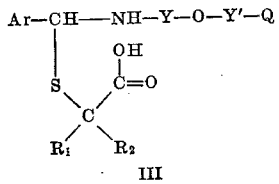

III and then ring closure of III by splitting out of water. Since the intermediate azomethine (II) is formed by reacting an araldehyde, ArCHO, with an amine $$Q-Y'-O-Y-NH_2$$

with the splitting out of water, this preparation is also conveniently run in the same reaction vessel using the same solvent, thus making isolation of the azomethine unnecessary. The mercaptoacetic acid is added to the solution of azomethine after no further water is formed by the reaction of the araldehyde with amine. Heating is then continued until no more water is collected, thereby indicating completion of the cyclization to form the thiazolidone ring. The intermediate benzaldehydes and amines used to prepare the azomethines, as well as the intermediate α-mercaptoacetic acids are generally known classes of compounds which are prepared by known methods. Illustrative of this procedure is the reaction of thioglycolic acid with the azomethine formed by reacting 3,4-dichlorobenzaldehyde with 2-methoxyethylamine to yield 2-(3,4-dichlorophenyl)-3-(2-methoxyethyl) - 4 - thiazolidone.

The above procedure, while preferred, can be modified, for example, it can be run without a solvent or using other solvents, e.g., toluene, ethanol, isopropyl alcohol, n-hexane, or it can be run at temperatures as low as about 50° C. or as high as 150° C. or greater, with the lower temperatures requiring a longer time for completion of the reaction. Another modification is to heat a mixture of an araldehyde of the formula ArCHO, an amine of the formula $O-Y'-O-Y-NH_2$ and said mercaptoacetic acid, where Ar, Q, Y', and Y have the meanings given herein above; the azomethine $$(Ar-CH=N-Y-O-Y'-Q)$$

first forms and then reacts with the mercaptoacetic acid as shown above.

The 2-aryl-3-(Q—Y'—O—Y)-4-thiazolidones-1-oxides having Formula I where Z is SO are prepared by oxidizing the corresponding 2-aryl-3-(Q—Y'—O—Y)-4-thiazolidones. This oxidation is carried out by reacting the 2-aryl-3-(Q—Y'—O—Y)-thiazolidine with an oxidizing agent effective to oxidize sulfides to sulfoxides. Various oxidative procedures can be employed but the one preferred in practicing my invention comprises using a per-organic acid, e.g., peracetic acid, in a suitable solvent, e.g., ethyl acetate. The reaction is exothermic and is carried out preferably by mixing the reactants at a low temperature, i.e., from 0° C. to 10° C. Other oxidizing agents that can be used are other per-organic acids, e.g., perbenzoic acid.

The 2-aryl-3-(Q—Y'—O—Y)-4-thiazolidone-1,1-dioxides of my invention (Formula I where Z is $SO_2$) are prepared preferably by oxidizing the corresponding 2-aryl-3-(Q—Y'—O—OY—)-4-thiazolidones (Formula I where Z is S). This oxidation is carried out by reacting the 2-aryl-3-(Q—Y'—O—Y)-4-thiazolidone with an oxidizing agent effective to oxidize sulfides to sulfones. Various oxidative procedures can be employed, but the one preferred in practicing my invention comprises using potassium permanganate in aqueous acetic acid solution. Other oxidizing agents that can be used include hydrogen peroxide, chromium trioxide ($CrO_3$), and the like. Also, the oxidation can be carried out using an excess of a per-organic acid, e.g., peracetic acid, at about room temperature (20–25° C.) for several days. Alternatively, the 2-aryl-3-(Q—Y'—O—Y)-4-thiazolidone-1,1-dioxides can be prepared by oxidizing the corresponding 1-oxides (Formula I where Z is SO), using these same oxidizing agents effective to oxidize sulfides to sulfones, e.g., potassium permanganate, hydrogen peroxide, etc.

The chemical structures of my

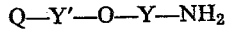

2-aryl-3-(Q—Y'—O—Y)-4-thiazolidones and corresponding -1-oxides and -1,1-dioxides are established by the mode of their syntheses and corroborated by the correspondence of calculated and found values for the elementary analyses for representative examples.

The following examples will further illustrate specific embodiments of the invention without, however, limiting it thereto.

Example 1

2-(3,4-dichlorophenyl) - 3 - (2-methoxyethyl)-4-thiazolidone was prepared as follows: A mixture of 26.2 g. of 3,4-dichlorobenzaldehyde, 17.3 g. of 65% aqueous 2-methoxyethylamine and 200 cc. of benzene was refluxed with a continuous separator connected to the reaction vessel for removal of water formed by the reaction (as well as water of the 2-methoxyethylamine solution). After two and one half hours, 7.6 cc. of water had been collected. The reaction mixture was then cooled and to it was added 15.7 g. of thioglycolic acid. The resulting reaction mixture was refluxed for an additional five hours, after which time a total of 10.4 cc. of water had been collected. The reaction mixture was poured into dilute aqueous ammonium hydroxide solution and the benzene layer separated. The benzene solution was washed twice with water and the benzene was removed by distilling in vacuo to yield 45.4 g. of yellow oil. The oil was distilled under reduced pressure to yield 33.8 g. (74%) of the product, 2-(3,4-dichlorophenyl)-3-(2-methoxymethyl)-4-thiazolidone, a yellow viscous oil, B.P. 153–155° C. at 0.10–0.11 mm., $n_D^{25}=1.5913$.

Analysis.—Calcd. for $C_{12}H_{13}Cl_2NO_2S$: Cl, 23.11; S, 10.47. Found: Cl, 22.39; S, 10.71.

Following the procedure described in Example 1 and using molar equivalent quantities of the appropriate reactants, the following compounds were prepared: 2-(2-chlorophenyl) - 3 - (2-methoxyethyl)-4-thiazolidone, B.P. 115–118° C. at 0.01 mm., $n_D^{25}=1.5783$, using 2-chlorobenzaldehyde, 2 - methoxyethylamine and thioglycolic acid; 2 - (4-chlorophenyl)-3-(2-methoxyethyl)-4-thiazolidone, B.P. 125–128° C. at 0.02 mm., $n_D^{25}=1.5799$, using 4-chlorobenzaldehyde, 2-methoxyethylamine and thioglycolic acid; 2-(2,4-dichlorophenyl)-3-(2-methoxyethyl)-4-thiazolidone, B.P. 136–138° C. at 0.005 mm., $n_D^{25}=1.5879$, using 2,4-dichlorobenzaldehyde, 2-methoxyethylamine and thioglycolic acid; 3-(2-methoxyethyl)-2-(4-methoxyphenyl) - 4 - thiazolidone, B.P. 142–145° C. at 0.002 mm., $n_D^{25}=1.5705$, using 4-methoxybenzaldehyde, 2-methoxyethylamine and thioglycolic acid; 3-(2-methoxyethyl)-2-phenyl-4-thiazolidone, B.P. 110–112° C. at 0.006 mm., $n_D^{26}=1.5708$, using benzaldehyde, 2-methoxyethylamine and thioglycolic acid; 2-(3,4-dichlorophenyl)-3-(3-methoxypropyl)-4-thiazolidone, B.P. 154° C. at 0.01 mm., $n_D^{25}=1.5838$, using 3,4-dichlorobenzaldehyde, 3-methoxypropylamine and trioglycolic acid; 2-(3,4-dichlorophenyl)-3-(2-ethoxyethyl) - 4-thiazolidone, B.P. 152–155° C. at 0.05 mm., $n_D^{25}=1.5800$, using 3,4-dichlorobenzaldehyde, 2-ethoxyethylamine and thioglycolic acid; 2-(3-chlorophenyl)-3-(2-methoxyethyl)-4-thiazolidone, B.P. 125–127° C. at 0.04 mm. $n_D^{25}=1.5798$, using 3-chlorobenzaldehyde, 2-methoxyethylamine and thioglycolic acid; 3-(2-methoxyethyl)-2-[4-(4-nitrophenoxy)phenyl] - 4 - thiazolidone, M.P. 107.2–108.4° C. (corr.) using 4-(4-nitrophenoxy)benzaldehyde, 2-methoxyethylamine and thioglycolic acid; 2-(4-n-butoxyphenyl)-3-(2-methoxyethyl)-4-thiazolidone, B.P. 155–157° C. at 0.02 mm., $n_D^{25}=1.5496$, using 4-n-butoxybenzaldehyde, 2-methoxyethylamine and thioglycolic acid; 3-(2-methoxyethyl) - 2 - (4-nitrophenyl)-4-thiazolidone, B.P. 180–182° C. at 0.02 mm., $n_D^{25}=1.5961$, using 4-nitrobenzaldehyde, 2 - methoxyethylamine and thioglycolic acid; 2-(3,4-dimethylphenyl)-3-(2-methoxyethyl) - 4 - thiazolidone, B.P. 145–146° C. at 0.002 mm., using 3,4-dimethylbenzaldehyde, 2-methoxyethylamine and thioglycolic acid; 3-(2-methoxyethyl)-2-(4-trifluoromethylphenyl)-4-thiazolidone, B.P. 116–119.0° C. at 0.030 mm., $n_D^{25}=1.5189$ using 4 - trifluoromethylbenzaldehyde, 2-methoxyethylamine and thioglycolic acid; 2-(3,4-dichlorophenyl)-3-(2-methoxyethyl) - 5 - methyl-4-thiazolidone, M.P. 55.0–57.6° C. (corr.), using 3,4-dichlorobenzaldehyde, 2-methoxyethylamine and α-mercaptopropionic acid; and, 2 - (3-chloro-4-methylphenyl)-3-(2-ethoxyethyl)-4-thiazolidone, a yellow oil, using 3-chloro-4-methylbenzaldehyde, 2 - ethoxyethylamine and thioglycolic acid.

Following the procedure described in Example 1 and using molar equivalent quantities of the appropriate reactants, the following compounds can be prepared: 3-(2-methoxypropyl)-2-(2-methylphenyl)-4-thiazolidone using 2-methylbenzaldehyde, 2-methoxypropylamine and thioglycolic acid; 3-(2-isopropoxyethyl)-2-(4-isopropylphenyl)-4-thiazolidone using 4-isopropylbenzaldehyde, 2-isopropoxyethylamine and thioglycolic acid; 3-(2-n-butoxyethyl)-2-(4-iodophenyl)-4-thiazolidone using 4-iodobenzaldehyde, 2-n-butoxyethylamine and thioglycolic acid; 2-(3 - bromophenyl)-3-(2-n-hexoxyethyl)-4-thiazoildone using 3-bromobenzaldehyde, 2-n-hexoxyethylamine and thioglycolic acid; 3-(4-methoxybutyl)-2-(2,4,6-trichlorophenyl)-4-thiazolidone using 2,4,6-trichlorobenzaldehyde, 4-methoxybutylamine and thioglycolic acid; 3-(6-ethoxyhexyl) - 2-(4-methoxyphenyl)-4-thiazolidone using 4-methoxybenzaldehyde, 6-ethoxyhexylamine and thioglycolic acid; 2 - (3-ethoxyphenyl)-3-(3-n-propoxypropyl)-4-thiazolidone using 3-ethoxybenzaldehyde, 3-n-propoxypropylamine and thioglycolic acid; 2-(3,4-dimethoxyphenyl)-3-(3-ethoxypropyl)-4-thiazolidone using 3,4-dimethoxybenzaldehyde, 3-ethoxypropylamine and thioglycolic acid; 2-(3-chloro-4-methoxyphenyl) - 3 - (2-methoxyethyl)-4-thiazolidone using 3-chloro-4-methoxybenzaldehyde, 2-methoxyethylamine and thioglycolic acid; 3-(2-ethoxybutyl)-2-(4-n-propylmercaptophenyl)-4-thiazolidone using 4-n-propylmercaptobenzaldehyde, 2-ethoxybutylamine and thioglycolic acid; 2 - (4-n-butylsulfonylphenyl) - 3 - (2-methoxyethyl)-4-thiazolidone using 4-n-butylsulfonylbenzaldehyde, 2 - methoxyethylamine and thioglycolic acid; 3-(2-ethoxyethyl) - 2 - (3-trifluoromethylphenyl)-4-thiazolidone using 3-trifluoromethylbenzaldehyde, 2-ethoxyethylamine and thioglycolic acid; 2-(4-acetylaminophenyl)-3-(3-methoxypropyl)-4-thiazolidone using 4-acetylaminobenzaldehyde, 3-methoxypropylamine and thioglycolic acid; 2-(4-aminophenyl)-3-(2-methoxyethyl)-4-thiazolidone is prepared preferably by reacting the corresponding 3 - (2-methoxyethyl)-2-(4-nitrophenyl)-4-thiazolidone with a reducing agent effective to reduce nitro groups to amino group, e.g., iron and HCl; 2-(4-n-butylaminophenyl)-3-(2-methoxyethyl) - 4 - thiazolidone using 4-n-butylaminobenzaldehyde, 2-methoxyethylamine and thioglycolic acid; 3-(2-ethoxyethyl)-2-(4-phenoxyphenyl)-4-thiazolidone using 4-phenoxybenzaldehyde, 2-ethoxyethylamine and thioglycolic acid; 2-(3-benzyloxyphenyl)-3-(3-ethoxypropyl)-4-thiazolidone using 3-benzyloxybenzaldehyde, 3-ethoxypropylamine and thioglycolic acid; 2 - (2-hydroxyphenyl)-3-(2-methoxyethyl)-4-thiazolidone using 2-hydroxybenzaldehyde, 2-methoxyethylamine and thioglycolic acid; 3-(2-methoxyethyl)-2-(4-phenylmercaptophenyl)-4-thiazolidone using 4-phenylmercaptobenzaldehyde, 2-methoxyethylamine and thioglycolic acid; 2-(3-benzylphenyl)-3-(2-methoxyethyl)-4-thiazolidone using 3-benzylbenzaldehyde, 2-methoxyethylamine and thioglycolic acid; 2-[4-(4-chlorophenoxy)phenyl] - 3 - (3-ethoxypropyl)-4-thiazolidone using 4-(4-chlorophenoxy)benzaldehyde, 3-ethoxypropylamine and thioglycolic acid; 3-(2-benzyloxyethyl)-2-(3,4-dichlorophenyl)-4-thiazolidone using 3,4-dichlorobenzaldehyde, 2-benzyloxyethylamine and thioglycolic acid; 2-(3,4-dichlorophenyl)-5-ethyl - 3 - [2-(2-phenylethoxy)ethyl]-4-thiazolidone using 3,4-dichlorobenzaldehyde, 2-(2-phenylethoxy)ethylamine and α-mercaptobutyric acid; 2-(3,4-dichlorophenyl) - 3 - [2-(4-chlorobenzyloxy)ethyl]-4-thiazolidone using 3,4-dichlorobenzaldehyde, 2-(4-chlorobenzyloxy)ethylamine and thioglycolic acid; 2-(3,4-dichlorophenyl)-5,5-dimethyl - 3 - (2-methoxyethyl)-4-thiazolidone using 3,4-dichlorobenzaldehyde, 2-methoxyethylamine and α-mercapto-α-methylpropionic acid; 2-(3,4-dichlorophenyl)-3-(2-phenoxyethyl)-4-thiazolidone using 3,4-dichlorobenzaldehyde, 2-(phenoxy)ethylamine and thioglycolic acid; 3-[2-(3,4-dichlorophenoxy)ethyl]-4-thiazolidone using 3,4-dichlorobenzaldehyde, 2-(3,4-dichlorophenoxy)ethylamine and thioglycolic acid; 5,5-diethyl-3-[2-(4-methoxyphenoxy)ethyl] - 2 - (2,4,6-tribromophenyl)-4-thiazolidone using 2,4,6-tribromobenzaldehyde, 2-(4-methoxyphenoxy)ethylamine and α-ethyl-α-mercaptobutyric acid; 2 - (3,4 - dichlorophenyl)-3-[2-(4-phenylbutoxy)ethyl]-4-thiazolidone using 3,4-dichlorobenzaldehyde, 2-(4-phenylbutoxy)ethylamine and thioglycolic acid; 2 - (2,4-dichlorophenyl)-3-[2-[2-(4-chlorophenyl)ethoxy]ethyl]-4-thiazolidone using 2,4-dichlorobenzaldehyde, 2-[2-(4-chlorophenyl)ethoxy]ethylamine and thioglycolic acid; 2-(3,4-dichlorophenyl)-3-(2-methoxyethyl)-5-n-propyl-4-thiazolidone using 3,4-dichlorobenzaldehyde, 2-methoxyethylamine and α-mercaptovaleric acid; and, 3-(2-methoxyethyl) - 2 - (3,4,5-trimethoxyphenyl)-4-thiazolidone using 3,4,5-trimethoxybenzaldehyde, 2-methoxyethylamine and thioglycolic acid.

Example 2

2 - (3,4-dichlorophenyl)-3-(2-methoxyethyl)-4-thiazolidone-1-oxide was prepared as follows: To a chilled solution (about 5° C.) of 13.1 g. of 2-(3,4-dichlorophenyl)-3-(2-methoxyethyl)-4-thiazolidone dissolved in 80 cc. of benzene was added dropwise with stirring over a period of about 30 minutes a solution containing 9.0 g. of 40% peracetic acid dissolved in 80 cc. of ethyl acetate. The cooled reatcion mixture was stirred for 30 minutes more after the addition had been completed. It was then washed twice with aqueous sodium bisulfite solution, twice with water, dried over anhydrous calcium sulfate, and evaporated in vacuo to yield about 13.8 g. of yellow oil. The oil was dissolved in hot isopropyl alcohol; the solution was cooled; and the solid that separated was collected and dried at 56° C. at 20 mm. for 18 hours to yield 10 g. of the product, 2-(3,4-dichlorophenyl)-3-(2-methoxyethyl) - 4 - thiazolidone - 1 - oxide, M.P. 113–114.8° C. (corr.)

*Analysis.*—Calcd. for $C_{12}H_{13}Cl_2NO_3S$: Cl, 22.01; S, 9.95. Found: Cl, 20.20; S, 10.10.

Following the procedure described in Example 2 and using molar equivalent quantities of the corresponding thiazolidone and peracetic acid, the following thiazolidone-1-oxides were prepared: 2-(2-chlorophenyl)-3-(2-methoxyethyl)-4-thiazolidone-1-oxide, M.P. 83.8–86.2° C. (corr.); 2-(2,4-dichlorophenyl)-3-(2-methoxyethyl)-4-thiazolidone-1-oxide, M.P. 140.2–142° C. (corr.); 2-(4-chlorophenyl)-3-(2 - methoxyethyl)-4-thiazolidone-1-oxide, M.P. 155.8–157.0° C. (corr.); 2-(3,4-dichlorophenyl) - 3 - (2-ethoxyethyl) - 4 - thiazolidone-1-oxide, M.P. 110.0–112.4° C. (corr.); 3-(2-methoxyethyl)-2-phenyl-4-thiazolidone-1-oxide, an orange oil, $n_D^{25}=1.5722$; 2-(3-chlorophenyl) - 2 - methoxyethyl)-4-thiazolidone-1-oxide, M.P. 85.2–86.6° C. (corr.); 2-(3,4-dichlorophenyl)-3-(3-methoxypropyl)-4-thiazolidone-1-oxide, M.P. 93.8–95.2° C. (corr.); 3-(2-methoxyethyl)-2-(4-nitrophenyl)-4-thiazolidone-1-oxide, M.P. 166.2–167.4° C. (corr.); 2-

(4-n-butoxyphenyl)-3-(2 - methoxyethyl)-4-thiazolidone-1-oxide, and orange oil, $n_D^{25}=1.5531$; 2-(3,4-dimethylphenyl)-3-(2-methoxyethyl)-4-thiazolidone - 1 - oxide, a yellow viscous oil; 3-(2-methoxyethyl) - 2 - (4-trifluoromethylphenyl)-4-thiazolidone-1-oxide, M.P. 104.0–105.8° C. (corr.); and, 2-(3-chloro-4-methylphenyl) - 3 - (2-ethoxyethyl)-4-thiazolidone-1-oxide, M.P. 80.4–82.4° C. (corr.).

Following the procedure described in Example 2 and using molar equivalent quantities of the corresponding thiazolidone and peracetic acid, the following thiazolidone-1-oxides can be prepared:

3-(2-methoxypropyl)-2-(2-methylphenyl)-4-thiazolidone-1-oxide,
3-(3-isopropoxyethyl)-2-(4-isopropylphenyl)-4-thiazolidone-1-oxide,
3-(2-n-butoxyethyl)-2-(4-iodophenyl)-4-thiazolidone-1-oxide,
2-(3-bromophenyl)-3-(2-n-hexoxyethyl)-4-thiazolidone-1-oxide,
3-(4-methoxybutyl)-2-(2,4,6-trichlorophenyl-4-thiazolidone-1-oxide,
3-(6-ethoxyhexyl)-2-(4-methoxyphenyl)-4-thiazolidone-1-oxide,
2-(3-ethoxyphenyl)-3-(3-n-propoxypropyl)-4-thiazolidone-1-oxide,
2-(3,4-dimethoxyphenyl)-3-(3-ethoxypropyl)-4-thiazolidone-1-oxide,
2-(3-chloro-4-methoxyphenyl)-3-(2-methoxyethyl)-4-thiazolidone-1-oxide,
3-(2-ethoxybutyl)-2-(4-n-propylmercaptophenyl)-4-thiazolidone-1-oxide,
2-(4-n-butylsulfonylphenyl)-3-(2-methoxyethyl)-4-thiazolidone-1-oxide,
3-(2-ethoxyethyl)-2-(3-trifluoromethylphenyl)-4-thiazolidone-1-oxide,
2-(4-acetylaminophenyl)-3-(3-methoxypropyl)-4-thiazolidone-1-oxide,
2-(4-aminophenyl)-3-(2-methoxyethyl)-4-thiazolidone-1-oxide,
2-(4-n-butylaminophenyl)-3-(2-methoxyethyl)-4-thiazolidone-1-oxide,
3-(2-ethoxyethyl)-2-(4-phenoxyphenyl)-4-thiazolidone-1-oxide,
2(3-benzyloxyphenyl)-3-(3-ethoxypropyl)-4-thiazolidone-1-oxide,
2-(2-hydroxyphenyl)-3-(2-methoxyethyl)-4-thiazolidone-1-oxide,
3-(2-methoxyethyl)-2-(4-phenylmercaptophenyl)-4-thiazolidone-1-oxide,
2-(3-benzylphenyl)-3-(2-methoxyethyl)-4-thiazolidone-1-oxide,
2-[4-(4-chlorophenoxy)phenyl]-3-(3-ethoxyethyl)-4-thiazolidone-1-oxide,
3-(2-benzyloxyethyl)-2-(3,4-dichlorophenyl)-4-thiazolidone-1-oxide,
2-(3,4-dichlorophenyl)-5-ethyl-3-[2-(2-phenylethoxy)ethyl]-4-thiazolidone-1-oxide,
2-(3,4-dichlorophenyl)-3-[2-(4-chlorobenzyloxy)ethyl]-4-thiazolidone-1-oxide,
2-(3,4-dichlorophenyl)-5,5-dimethyl-3-(2-methoxyethyl)-4-thiazolidone-1-oxide,
2-(3,4-dichlorophenyl)-3-(2-phenoxyethyl)-4-thiazolidone-1-oxide,
2-(3,4-dichlorophenyl)-3-[2-(3,4-dichlorophenoxy)ethyl]-4-thiazolidone-1-oxide,
5,5-diethyl-3-[2-(4-methoxyphenoxy)ethyl]-2-(2,4,6-tribromophenyl)-4-thiazolidone-1-oxide,
2-(3,4-dichlorophenyl)-3-[2-(4-phenylbutoxy)ethyl]-4-thiazolidone-1-oxide,
2-(2,4-dichlorophenyl)-3-[2-[2-(4-chlorophenyl)ethoxy]ethyl]-4-thiazolidone-1-oxide,
2-(3,4-dichlorophenyl)-3-(2-methoxyethyl)-5-methyl-4-thiazolidone-1-oxide,
2-(3,4-dichlorophenyl)-3-(2-methoxyethyl)-5-n-propyl-4-thiazolidone-1-oxide, and
3-(2-methoxyethyl-2-(3,4,5-trimethoxyphenyl)-4-thiazolidone-1-oxide.

Example 3

2-(3,4-dichlorophenyl)-3-(2-methoxyethyl) - 4-thiazolidone-1,1-dioxide was prepared as follows: To a stirred solution containing 10 g. of 2-(3,4-dichlorophenyl)-3-(2-methoxyethyl)-4-thiazolidone dissolved in 40 cc. of acetic acid and kept between 20–25° C., was added dropwise a solution containing 10 g. of potassium permanganate in 100 cc. of water. The reaction mixture was decolorized by adding an aqueous solution of sodium bisulfite. The oily precipitate was extracted with chloroform and the chloroform extract was heated in vacuo to remove the chloroform, thereby yielding 13.9 g. of yellow oily product. The oil was again dissolved in chloroform, the chloroform solution ran through a column (1″ x 18″) containing an activated magnesium silicate (Florisil®) and then distilled in vacuo to remove the chloroform. The resulting oil was heated at 40° C. and 0.075 mm. for one hour to yield 7.5 g. of the product, 2-(3,4-dichlorophenyl)-3-(2-methoxyethyl)-4-thiazolidone-1,1-dioxide, a pale yellow viscous oil, $n_D^{25}=1.5750$.

Analysis.—Calcd. for $C_{12}H_{13}Cl_2NO_4S$: N, 4.15; S, 9.48. Found: N, 3.92; S, 9.27.

Example 4

2-(4-chlorophenyl)-3-(2 - methoxyethyl) - 4 - thiazolidone-1,1-dioxide was prepared as follows: To a chilled solution (4° C.) of 11.9 g. of 2-(4-chlorophenyl)-3-(2-methoxyethyl)-4-thiazolidone dissolved in 50 cc. of benzene was added with swirling a solution containing 25.0 g. of 40% peracetic acid dissolved in 75 cc. of ethyl acetate. The temperature of the reaction mixture rose to about 27° C. The reaction mixture was then allowed to stand at room temperature for three days. It was washed first with dilute sodium bisulfite solution and then evaporated by distilling in vacuo to yield an oily material which solidified when triturated with isopropyl alcohol. The solid was collected and recrystallized twice from isopropyl alcohol to yield about 8 g. of the product, 2-(4-chlorophenyl)-3-(2-methoxyethyl)-4-thiazolidone - 1,1 - dioxide, M.P. 83.2–87.4° C. (corr.).

Analysis.—Calcd. for $C_{12}H_{14}ClNO_4S$: C, 47.48; H, 4.65; Cl, 11.70; S, 10.52. Found: C, 47.50; H, 4.58; Cl, 12.00; S, 10.95.

Following the procedure described in Example 4 and using molar equivalent quantities of the corresponding thiazolidone and peracetic acid, the following thiazolidone-1,1-dioxides were prepared: 2-(2 - chlorophenyl) - 3 - (2-methoxyethyl)-4-thiazolidone - 1,1 - dioxide, M.P. 107.8–110.4° C. (corr.); 2-(2,4-dichlorophenyl)-3-(2-methoxyethyl)-4-thiazolidone-1,1-dioxide, M.P. 124.6–126.2° C. (corr.); 2 - (3,4 - dichlorophenyl)-3-(3-methoxypropyl)-4-thiazolidone-1,1-dioxide, M.P. 94.8–97.0° C. (corr.); 3-(2-methoxyethyl)-2-(4-methoxyphenyl) - 4 - thiazolidone-1,1-dioxide, M.P. 81.6–82.8° C. (corr.); 3-(2-methoxyethyl)-2-phenyl-4-thiazolidone-1,1-dioxide, a pale yellow oil; 2-(3-chlorophenyl)-3-(2-methoxyethyl) - 4 - thiazolidone-1,1-dioxide, M.P. 123.2–125.8° C. (corr.); 3-(2-methoxyethyl)-2-(4-nitrophenyl) - 4 - thiazolidone-1,1-dioxide, M.P. 118.4–119.2° C. (corr.); 3-(2-methoxyethyl)-2-(4-trifluoromethylphenyl)-4-thiazolidone - 1,1-dioxide, M.P. 89.4–92.8° C. (corr.); and, 2-(3-chloro-4-methylphenyl)-3-(2-ethoxyethyl)-4-thiazolidone - 1,1 - dioxide, M.P. 99.0–101.0° C. (corr.).

Following the procedure described in Example 3 or 4 and using molar equivalent quantities of the corresponding thiazolidone and potassium permanganate or peracetic acid, respectively, the following thiazolidone-1,1-dioxides can be prepared:

3-(2-methoxypropyl)-2-(2-methylphenyl)-4-thiazolidone-1,1-dioxide, 3-(3-isopropoxyethyl)-2-(4-isopropylphenyl)-4-thiazolidone-1,1-dioxide,
3-(2-n-butoxyethyl)-2-(4-iodophenyl)-4-thiazolidone-1,1-dioxide,
2-(3-bromophenyl)-3-(2-n-hexoxyethyl)-4-thiazolidone-1,1-dioxide,
3-(4-methoxybutyl)-2-(2,4,6-trichlorophenyl)-4-thiazolidone-1,1-dioxide,
3-(6-ethoxyhexyl)-2-(4-methoxyphenyl)-4-thiazolidone-1,1-dioxide,
2-(3-ethoxyphenyl)-3-(3-n-propoxypropyl)-4-thiazolidone-1,1-dioxide,
2-(3,4-dimethoxyphenyl)-3-(3-ethoxypropyl)-4-thiazolidone-1,1-dioxide,
2-(3-chloro-4-methoxyphenyl)-3-(2-methoxyethyl)-4-thiazolidone-1,1-dioxide,
3-(2-ethoxybutyl)-2-(4-n-propylmercaptophenyl)-4-thiazolidone-1,1-dioxide,
2-(4-n-butylsulfonylphenyl)-3-(2-methoxyethyl)-4-thiazolidone-1,1-dioxide,
3-(2-ethoxyethyl)-2-(3-trifluoromethylphenyl)-4-thiazolidone-1,1-dioxide,
2-(4-acetylaminophenyl)-3-(3-methoxypropyl)-4-thiazolidone-1,1-dioxide,
2-(4-aminophenyl)-3-(2-methoxyethyl)-4-thiazolidone-1,1-dioxide,
3-(2-ethoxyethyl)-2-(4-phenoxyphenyl)-4-thiazolidone,1,1-dioxide,
2-(3-benzyloxyphenyl)-3-(3-ethoxypropyl)-4-thiazolidone-1,1-dioxide,
2-(2-hydroxyphenyl)-3-(2-methoxyethyl)-4-thiazolidone-1,1-dioxide,
3-(2-methoxyethyl)-2-(4-phenylmercaptophenyl)-4-thiazolidone-1,1-dioxide,
2-(3-benzylphenyl)-3-(2-methoxyethyl)-4-thiazolidone-1,1-dioxide,
2-[4-(4-chlorophenoxy)phenyl]-3-(3-ethoxyethyl)-4-thiazolidone-1,1-dioxide,
3-(2-benzyloxyethyl)-2-(3,4-dichlorophenyl)-4-thiazolidone-1,1-dioxide,
2-(3,4-dichlorophenyl)-5-ethyl-3-[2-(2-phenylethoxy)ethyl]-4-thiazolidone-1,1-dioxide,
2-(3,4-dichlorophenyl)-3-[2-(4-chlorobenzyloxy)ethyl]-4-thiazolidone-1,1-dioxide,
2-(3,4-dichlorophenyl)-5,5-dimethyl-3-(2-methoxyethyl)-4-thiazolidone-1,1-dioxide,
2-(3,4-dichlorophenyl)-3-(2-phenoxyethyl)-4-thiazolidone-1,1-dioxide,
3-[2-(3,4-dichlorophenoxy)ethyl]-4-thiazolidone,1,1-dioxide,
5,5-diethyl-3-[2-(4-methoxyphenoxy)ethyl]-2-(2,4,6-tribromophenyl)-4-thiazolidone-1,1,dioxide,
2-(3,4-dichlorophenyl)3-[2-(4-phenylbutoxy)ethyl]-4-thiazolidone-1,1-dioxide,
2-(2,4-dichlorophenyl)-3-[2-[2-(4-chlorophenylethoxy]ethyl]-4-thiazolidone-1,1-dioxide,
2-(3,4-dichlorophenyl)-3-(2-methoxyethyl)-5-methyl-4-thiazolidone-1,1-dioxide,
2-(3,4-dichlorophenyl)-3-(2-methoxyethyl)-5-n-propyl-4-thiazolidone-1,1-dioxide, and
3-(2-methoxyethyl)-2-(3,4,5-trimethoxyphenyl)-4-thiazolidone-1,1-dioxide.

My compounds of Formula I have psychomotor stimulatory properties, anticonvulsant activity, barbiturate potentiating activity and low toxicity, thus indicating their utility as agents for the regulation of the central nervous system. When administered orally to mice using a modified procedure of the photocell activity cage method of Dews [Brit. J. Pharmacol., 8, 46 (1953)], they were found to be psychomotor stimulatory at dose levels of about 25 to 400 mg. per kg. of body weight. For example, the following compounds produced marked stimulation at doses of about 200 mg. per kg.:

2-(3,4-dichlorophenyl)-3-(2-methoxyethyl)-4-thiazolidon,
2-(3,4-dichlorophenyl)-3-(3-methoxypropyl)-4-thiazolidone,
2-(3,4-dichlorophenyl)-3-(2-methoxyethyl)-4-thiazolidone-1-oxide,
2-(3,4-dichlorophenyl)-3-(3-methoxypropyl)-4-thiazolidone-1-oxide,
3-(2-methoxyethyl)-2-(4-trifluoromethylphenyl)-4-thiazolidone-1-oxide,
2-(3,4-dichlorophenyl)-3-(2-methoxyethyl)-3-(2-methoxyethyl)-4-thiazolidone-1,1-dioxide,
2-(3,4-dichlorophenyl)-3-(3-methoxypropyl)-4-thiazolidone-1,1-dioxide and
3-(2-methoxyethyl)-2-(4-trifluoromethylphenyl)-4-thiazolidone-1,1-dioxide.

The following compounds were found to protect against metrazol or maximal electroshock convulsions when tested by standard procedures in mice:

2-(3,4-dichlorophenyl)-3-(2-methoxyethyl)-4-thiazolidone-1-oxide,
2-(3,4-dichlorophenyl)-3-(2-methoxyethyl)-4-thiazolidone,
2-(4-n-butoxyphenyl)-3-(2-methoxyethyl)-4-thiazolidone,
3-(2-methoxyethyl)-2-(4-trifluoromethylphenyl)-4-thiazolidone and
3-(2-methoxyethyl)-2-(4-trifluoromethylphenyl)-4-thiazolidone-1-oxide.

The compounds of my invention potentiate the sedative activity of sodium hexobarbital. Thus, when tested by standard procedures in mice, e.g., by intraperitoneal injection in groups of ten mice the compound at a given dose (e.g. 10 to 100 mg./kg.) 40 or 90 minutes prior to intraperitoneal injection of sodium hexobarbital (40 mg./kg.) and checking the loss of righting reflex of each animal at 10, 15 and 20 minutes after the sodium hexobarbitol injection, the following compounds produced 50% or greater difference in loss of righting reflex compared with untreated controls at a dose of 100 mg./kg. of the compound:

2-(3,4-dichlorophenyl)-3-(2-methoxyethyl)-4-thiazolidone,
2-(4-chlorophenyl)-3-(2-methoxyethyl)-4-thiazolidone,
2-(2,4-dichlorophenyl)-3-(2-methoxyethyl)-4-thiazolidone,
3-(2-methoxyethyl)-2-phenyl-4-thiazolidone,
2-(3-chlorophenyl)-3-(2-methoxyethyl)-4-thiazolidone,
3-(2-methoxyethyl)-2-[4-(4-nitrophenoxy)phenyl]-4-thiazolidone,
2-(4-n-butoxyphenyl)-3-(2-methoxyethyl)-4-thiazolidone,
3-(2-methoxyethyl)-2-(4-nitrophenyl)-4-thiazolidone,
3-(2-methoxyethyl)-2-(4-trifluoromethylphenyl)-4-thiazolidone,
2-(3,4-dichlorophenyl)-3-(2-methoxyethyl)-4-thiazolidone-1-oxide,
2-(4-chlorophenyl)-3-(2-methoxyethyl)-4-thiazolidone-1-oxide,
2-(3,4-dichlorophenyl)-3-(2-ethoxyethyl)-4-thiazolidone-1-oxide,
3-(2-methoxyethyl)-2-phenyl-4-thiazolidone-1-oxide,
3-(2-methoxyethyl)-2-(4-nitrophenyl)-4-thiazolidone-1-oxide,
2-(4-n-butoxyphenyl)-3-(2-methoxyethyl)-4-thiazolidone-1-oxide,
3-(2-methoxyethyl)-2-(4-trifluoromethylphenyl)-4-thiazolidone-1-oxide,
2-(3,4-dichlorophenyl)-3-(2-methoxyethyl)-4-thiazolidone-1,1-dioxide,
2-(4-chlorophenyl)-3-(2-methoxyethyl)-4-thiazolidone-1,1-dioxide,
2-(2-chlorophenyl)-3-(2-methoxyethyl)-4-thiazolidone-1,1-dioxide, 2-(2,4-dichlorophenyl)-3-(2-methoxyethyl)-4-thiazolidone-1,1-dioxide and
2-(3-chlorophenyl)-3-(2-methoxyethyl)-4-thiazolidone-1,1-dioxide.

As illustrative of the low toxicities of my compounds, the following compounds were found to have approximate acute oral toxicities (ALD$_{50}$) in mice in the range of about 1000 to 4000 mg. per kg.: 2-(3,4-dichlorophenyl)-3-(2-methoxyethyl)-4-thiazolidone, 2-(3,4-dichlorophenyl)-3-(2-methoxyethyl)-4-thiazolidone-1-oxide, 2-(3,4-dichlorophenyl)-3-(3-methoxypropyl)-4-thiazolidone-1-oxide and 2-(3,4-dichlorophenyl)-3-(3-methoxypropyl)-4-thiazolidone-1,1-dioxide.

I claim:
1. A compound of the formula

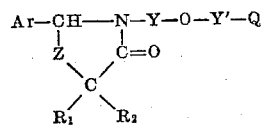

where Ar is a member of the group consisting of phenyl and phenyl substituted by one to three substituents selected from lower-alkyl, lower-alkoxy, lower-alkylmercapto, lower-alkylsulfonyl, halo, trifluoromethyl, nitro, amino, lower-alkylamino, lower-alkanoylamino, phenoxy, benzyloxy, hydroxy, phenylmercapto, benzyl and 4-chlorophenoxy, Y is polycarbon-lower-alkylene having from two to six carbon atoms and having its two free valence bonds on different carbon atoms, Y' is a direct linkage or lower-alkylene having from one to six carbon atoms, Q is lower-alkyl or Ar as defined above, Z is S, SO or SO$_2$, and R$_1$ and R$_2$ each is hydrogen or lower-alkyl.

2. 3-[(lower-alkoxy)-(polycarbon-lower-alkyl)]-2-(dihalophenyl)-4-thiazolidone according to claim 1 where Ar is dihalophenyl, Q—Y' is lower-alkyl, Z is S, and R$_1$ and R$_2$ are each hydrogen.

3. 3-[(lower-alkoxy)-(polycarbon-lower-alkyl)]-2-(dihalophenyl)-4-thiazolidone-1-oxide according to claim 1 where Ar is dihalophenyl, Q—Y' is lower-alkyl, Z is SO, and R$_1$ and R$_2$ are each hydrogen.

4. 3-[(lower-alkoxy)-(polycarbon-lower-alkyl)]-2-(dihalophenyl)-4-thiazolidone-1,1-dioxide according to claim 1 where Ar is dihalophenyl, Q—Y' is lower-alkyl, Z is SO$_2$, and R$_1$ and R$_2$ are each hydrogen.

5. 2-(3,4-dichlorophenyl)-3-(2-methoxyethyl)-4-thiazolidone according to claim 2 where dihalophenyl is 3,4-dichlorophenyl and (lower-alkoxy)-(polycarbon-lower-alkyl) is 2-methoxyethyl.

6. 2-(3,4-dichlorophenyl)-3-(3-methoxypropyl)-4-thiazolidone according to claim 2 where dihalophenyl is 3,4-dichlorophenyl and (lower-alkoxy)-(polycarbon-lower-alkyl) is 3-methoxypropyl.

7. 3-(2-methoxyethyl)-2-(4-methoxyphenyl)-4-thiazolidone according to claim 1 where Ar is 4-methoxyphenyl, Q—Y'—O—Y is 2-methoxyethyl, Z is S, and R$_1$ and R$_2$ are each hydrogen.

8. 2-(3,4-dichlorophenyl)-3-(2-methoxyethyl)-4-thiazolidone-1-oxide according to claim 3 where dihalophenyl is 3,4-dichlorophenyl and (lower-alkoxy)-(polycarbon-lower-alkyl) is 2-methoxyethyl.

9. 2-(3,4-dichlorophenyl)-3-(3-methoxypropyl)-4-thiazolidone-1-oxide according to claim 3 where dihalophenyl is 3,4-dichlorophenyl and (lower-alkoxy)-(polycarbon-lower-alkyl) is 3-methoxypropyl.

10. 2-(3,4-dichlorophenyl)-3-(2-methoxyethyl)-4-thiazolidone-1,1-dioxide according to claim 4 where dihalophenyl is 3,4-dichlorophenyl and (lower-alkoxy)-(polycarbon-lower-alkyl) is 2-methoxyethyl.

11. 2-(3,4-dichlorophenyl)-3-(3-methoxypropyl)-4-thiazolidone-1,1-dioxide according to claim 4 where dihalophenyl is 3,4-dihalophenyl and (lower-alkoxy)-(polycarbon-lower-alkyl) is 3-methoxypropyl.

12. A compound according to claim 1 where Ar is trifluorophenyl, Q is lower-alkyl and Y' is a direct linkage.

13. 3-(2-methoxyethyl)-2-(4-trifluoromethylphenyl)-4-thiazolidone-1-oxide according to claim 1 where Ar is 4-trifluoromethylphenyl, Q—Y'—O—Y is 2-methoxyethyl, Z is SO, and R$_1$ and R$_2$ are each hydrogen.

References Cited

UNITED STATES PATENTS 2,647,906  8/1953  Surrey _____ 260—301

ALTON D. ROLLINS, *Primary Examiner.*

UNITED STATES PATENT OFFICE
CERTIFICATE OF CORRECTION

Patent No. 3,377,355                          April 9, 1968

Alexander R. Surrey

It is certified that error appears in the above identified patent and that said Letters Patent are hereby corrected as shown below:

Column 2, line 17, "acetaylamino" should read -- acetylamino --. Column 4, line 39, "(2-methoxymethyl)" should read -- (2-methoxyethyl) --. line 61, "$n_D 26$" should read -- $n_D 25$ --; line 65, "trioglycolic" should read -- thioglycolic --. Column 6, line 55, "113-114.8°" should read -- 113.4-114.8° --. Column 7, line 2, "organe" should read -- orange --. Column 9, line 54, "(4-chlorophenylethoxy]" should read -- (4-chlorophenyl)ethoxy] --.

Signed and sealed this 6th day of January 1970.

(SEAL)
Attest:

Edward M. Fletcher, Jr.                        WILLIAM E. SCHUYLER, JR.
Attesting Officer                               Commissioner of Patents